(12) United States Patent
Selin

(10) Patent No.: US 7,110,416 B2
(45) Date of Patent: Sep. 19, 2006

(54) METHOD AND APPARATUS FOR REDUCING SYNCHRONIZATION DELAY IN PACKET-BASED VOICE TERMINALS

(75) Inventor: Jari Selin, Helsinki (FI)

(73) Assignee: Nokia Corporation, Espoo (FI)

( * ) Notice: Subject to any disclaimer, the term of this patent is extended or adjusted under 35 U.S.C. 154(b) by 1045 days.

(21) Appl. No.: 09/946,066

(22) Filed: Sep. 4, 2001

(65) Prior Publication Data

US 2003/0043784 A1   Mar. 6, 2003

(51) Int. Cl.
  *H04J 3/17* (2006.01)
(52) U.S. Cl. .................. 370/433; 370/435; 370/352
(58) Field of Classification Search ............. None
  See application file for complete search history.

(56) References Cited

U.S. PATENT DOCUMENTS

| | | | |
|---|---|---|---|
| 5,699,481 A | 12/1997 | Shlomot et al. | 395/2.37 |
| 5,825,771 A | 10/1998 | Cohen et al. | 370/394 |
| 6,181,712 B1 | 1/2001 | Rosengren | |
| 6,259,677 B1 * | 7/2001 | Jain | 370/252 |
| 6,452,950 B1 | 9/2002 | Ohlsson et al. | 370/516 |
| 6,504,838 B1 * | 1/2003 | Kwan | 370/352 |

FOREIGN PATENT DOCUMENTS

| | | |
|---|---|---|
| EP | 0921666 A2 | 6/1999 |
| WO | WO 01/11832 A1 | 2/2001 |
| WO | WO 01/48736 A1 | 7/2001 |

\* cited by examiner

*Primary Examiner*—Wellington Chin
*Assistant Examiner*—Robert W. Wilson
(74) *Attorney, Agent, or Firm*—Harrington & Smith, LLP

(57) ABSTRACT

Circuitry, embodied in a media subsystem, reproduces a speech or other type of audio signal, and is operable during a time that comfort noise is being generated for storing data from an arriving data packet that contains data representing a beginning of an interval of speech. The circuitry detects that data representing speech has been stored and synchronizes the circuitry to the beginning of the interval of speech by terminating the generation of comfort noise that precedes the interval of speech, and reproduces the speech by decoding the stored data from the data packet and converting the decoded data to an audio speech signal. The arriving data packet contains at least one frame of speech data having a duration of X milliseconds, and the circuitry includes an audio device, such as a DAC or a PCM connection, that requests decoded speech data at a rate given by X/Y milliseconds, where Y is greater than one. By example, the frame of speech data has a duration in the range of about 20 milliseconds to about 60 milliseconds, and an audio device requests decoded speech data at a rate of less than every 10 milliseconds (e.g., every 5 milliseconds). The circuitry may be contained within a wireless communications device, such as a cellular telephone or a personal communicator.

15 Claims, 3 Drawing Sheets

METHOD AND APPARATUS FOR REDUCING SYNCHRONIZATION DELAY IN PACKET-BASED VOICE TERMINALS

TECHNICAL FIELD

These teachings relate generally to methods and systems that process packetized audio data and, more particularly, these teachings pertain to systems and methods that receive and playback Internet Protocol (IP) speech or voice data packets, such as wireless communications terminals and personal computer (PC) based terminals.

BACKGROUND

It is well known in packet-based terminals and devices, such as wireless communications terminals (e.g., mobile and cellular telephones or personal communicators), PC-based terminals as well as IP telephony gateways, that an audio device requests data to be converted into audio at regular, fixed intervals. These intervals are not, however, synchronized to the reception of the data packets that contain the audio data. A given packet can contain one or more frames of data, where the length or duration of an audio signal contained within the frame is generally in the range of 20 ms to 30 ms (referred to herein generally as the "frame length", although a temporal measure is intended, not a spatial measure.) After reception, the audio data frame is typically stored into a jitter buffer to await its calculated playout time. The playout time is the time during which the frame of audio data is to be converted to an audio signal, such as by a digital-to-analog converter (DAC), then amplified and reproduced for a listener through a speaker or some other type of audio transducer. In the case of gateways and transcoders, the audio is typically sent to a sample-based circuit switched network. In that the audio device requests the frame data at random intervals, relative to the receipt of the audio packets, the data can be stored for a variable amount of time in the jitter buffer. The storage time in the jitter buffer can be shown to be, on average, one half of the duration of the frame, and consists of the desired jitter buffer duration and the undesired synchronization delay. In FIG. 2 this is demonstrated: the packet stays in the jitter buffer first for the desired 10 ms, after which it is playable, the frame, however will be fetched at some time during the next 20 ms, resulting in the undesired average of 10 ms of additional storage time in the jitter buffer.

A problem arises because of the fact that in modern voice terminals and similar devices, such as IP telephony gateways, the audio device is synchronized to some local frequency source. The frequency source may be, for example, an oscillator or a telephone network clock signal. However, in packet-based terminals, the packets containing the voice data arrive at a rate that is independent of and asynchronous to the frequency source that drives the audio device. The difference between the rate of IP packet arrival and the rate at which the audio device requests frames of voice data can create an undesirable and variable "synchronization delay".

In EP 0 921 666 A2 Ward et al. are said to reduce degradation in packetized voice communications that are received by a non-synchronized entity from a packet network by adjusting a depth of storage of a jitter buffer in the receiver. Units of voice sample data are stored in the jitter buffer as they are received. From time to time the rate of extraction of the stored units from the jitter buffer is accelerated by extracting two units, but delivering only one, or is retarded by not extracting a unit, while delivering a substitute unit in its place. This technique is said to control the depth of storage in response to packet reception events such that the delay is minimized, while providing a sufficient amount of delay to smooth the variances between packet reception events.

In WO 01/11832 A1 Nakabayashi describes the use of a receive buffer that stores packets received from a network interface, and a reproduction controller that refers to the state of the receive buffer to carry out a sound reproduction operation. A decoder receives the stored data, and the decoded data is provided to a DAC that is clocked by a reproduce clock. The process is said to prevent to the underflow and overflow of the receive buffer due to clock differences between the transmitter and the receiver, and to prevent packet jitter that results in sound dropouts.

In U.S. Pat. No. 6,181,712 B1 Rosengren describes transmitting packets from an input stream to an output stream. When multiplexing transport streams, packet jitter may be introduced to the extent that decoder buffers can underflow or overflow. To avoid this, a time window is associated with a data packet and position information is provided in the packet concerning the position of the packet within the window.

SUMMARY OF THE PREFERRED EMBODIMENTS

The foregoing and other problems are overcome, and other advantages are realized, in accordance with the presently preferred embodiments of these teachings.

Circuitry and related methods, embodied in a media subsystem, reproduces a speech or other type of audio signal, and is operable during a time that comfort noise is being generated for storing data from an arriving data packet that contains data representing a beginning of an interval of speech. The circuitry detects that data representing speech has been stored and synchronizes the circuitry to the beginning of the interval of speech by terminating the generation of comfort noise that precedes the interval of speech, and reproduces the speech by decoding the stored data from the data packet and converting the decoded data to an audio speech signal. The arriving data packet contains at least one frame of speech data having a duration of X milliseconds, and the circuitry includes an audio device, such as a DAC or a pulse code modulation (PCM) connection, that requests decoded speech data at a rate given by X/Y milliseconds, where Y is greater than one. By example, the frame of speech data has a duration in the range of about 20 milliseconds to about 60 milliseconds, and an audio device requests decoded speech data at a rate of less than every 10 milliseconds (e.g., every 5 milliseconds). PCM is a conventional circuit switched technique for transmitting voice.

The circuitry further includes a jitter buffer for storing data from the packet and a buffer for storing the decoded frame of speech data. The circuitry operates in response to detecting that data representing speech has been stored in the jitter buffer for replacing a frame of comfort noise data stored in the buffer with a decoded frame of speech data representing the beginning of the interval of speech.

In one exemplary, but not limiting, embodiment the circuitry is contained within a wireless communications device, such as a cellular telephone or a personal communicator. In other embodiments the circuitry and method can be a feature of, for example, PC-based terminals, IP telephony gateways and IP-to-circuit switched media transcoders

BRIEF DESCRIPTION OF THE DRAWINGS

The foregoing and other aspects of these teachings are made more evident in the following Detailed Description of the Preferred Embodiments, when read in conjunction with attached Drawing Figures, wherein.

DETAILED DESCRIPTION OF THE PREFERRED EMBODIMENTS

It is noted at the outset that these teachings are applicable to any system or apparatus that processes and plays back packetized (or framed) audio data, such as mobile and cellular telephones, personal communicators, PC-based terminals, IP telephony gateways and IP-to-circuit switched media transcoders. These various types of devices and systems may all be referred to herein simply as a terminal. In other words, these teachings are applicable to any device that links packet-based voice to circuit switched or otherwise continuous voice. Hence the method is also applicable to these various devices, including gateways and transcoders linking IP and PCM links.

Figure 1:
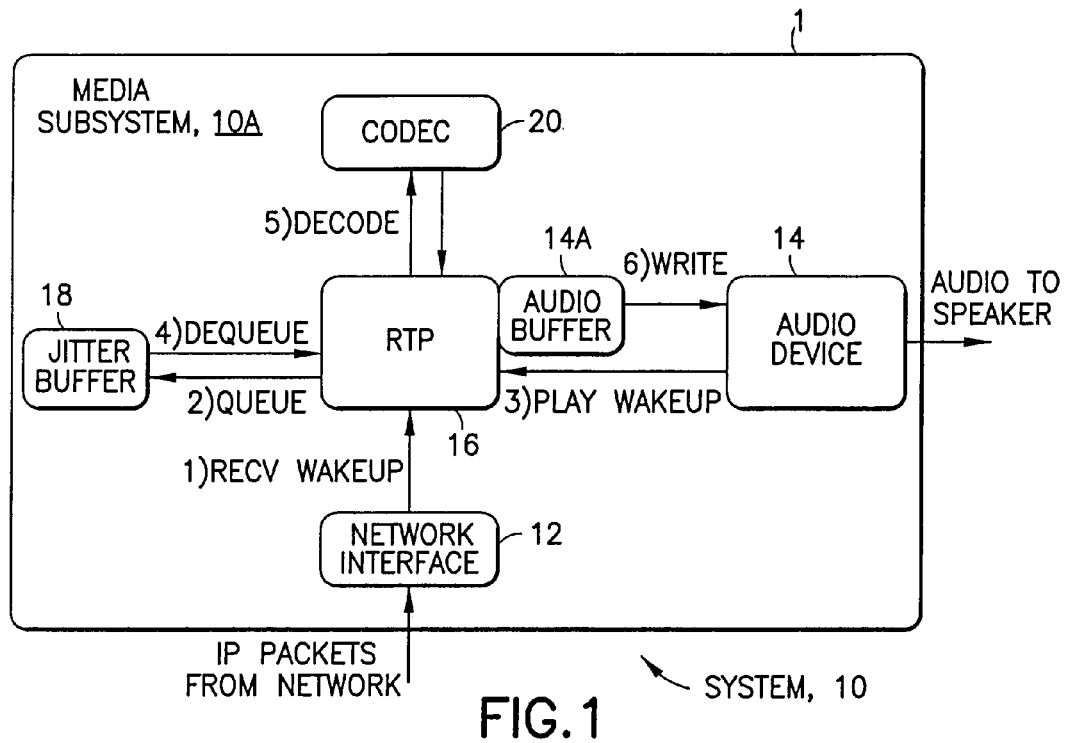
FIG. 1 is a simplified block diagram of a media subsystem of an audio reproduction system, and also depicts media flow during audio data packet reception and playback.

FIG. 1 is a simplified block diagram of a medium subsystem 10A of an audio reproduction system 10, and also depicts the media flow during audio reception. While described primarily in the context of a wireless communication device, such as a cellular telephone or a personal communicator, it should be appreciated that the system 10 can also be, by example and not by way of limitation, a PC-based terminal or an IP telephony gateway. IP packets arrive at a network interface 12 from a physical layer, in this case some type of packet switched medium or network, such as a dial-up telephone line, an Ethernet connection, or a wireless air interface (e.g., the packets are modulated onto an RF carrier or onto an optical carrier). The network interface 12 may also be referred to as the IP stack of the system 10. The time of arrival of individual packets at the network interface 12 is not synchronized with the operation of an audio device 14, which may be by way of example only a DAC of a mobile telephone, or the PCM connection of an IP telephony gateway. The audio device 14 may implement one of a number of different interfaces such as, but not limited to Linux audio API (application programming interface), Windows audio API, and PCM line card.

When a packet arrives at the network interface 12 the media subsystem 10A receives a callback (1), and the packet is received by a real-time transport protocol (RTP) module 16. Reference with regard to RTP may be had to H. Schulzrinne, S. Casner, R. Frederick and V. Jacobson, *RTP: a transport protocol for real-time applications*, IETF Network Working Group, RFC 1889, Standards Track, January 1996, 75 p. and to H. Schulzrinne, *RTP Profile for Audio and Video Conferences with Minimal Control*, IETF Network Working Group RFC 1890, Standards Track, January 1996, 18 p. Playout times for the frames contained within the packet are calculated. In a next step (2) the RTP module 16 inserts or queues the frames into a jitter buffer 18. When the audio device 14 begins to run out of data to play, it wakes up or interrupts the media subsystem 10A (3) and makes a request to the RTP module 16 for more data to play. In response, the RTP module 16 checks if there is enough speech data in its internal audio buffer to fill the audio device buffer. If there is enough data, it is written immediately to the audio device. (jump to step 6) If the data in the buffer is comfort noise, or there is not enough data, the next playable frame is dequeued or fetched from the jitter buffer 18 according to the frame's calculated playout time (4). The dequeued frame is then sent to an audio codec 20 such as, but not limited to, a PCM codec, a G.711 codec (*Pulse code modulation (PCM) of voice frequencies*, ITU-T Recommendation G.711, 1972, 18 p.), a G.723.1 codec (*Dual rate speech coder for multimedia communications transmitting at 5.3 and 6.3 kbit/s*, ITU-T Recommendation G.723.1, March 1996, 27 p.), or an AMR codec (*Mandatory speech codec speech processing functions. AMR speech codec; transcoding functions*, 3GPP Technical specification Group Services and System Aspects, 3G TS 26.090 V3.0.1, September 1999, 61 p.), which decodes the audio data and returns a decoded audio data frame to the RTP module 16 at step (5). The various codecs 20 that are useable by the apparatus and method of these teachings may or may not have a voice activity detection (VAD) function. If there was no data in the jitter buffer to decode, comfort noise or error concealment data is generated, depending on codec type and internal state. At step (6), the RTP module 16 writes the audio data to audio device 14, and the media subsystem 10A then returns to the sleep state to wait for the next wakeup.

Figure 2:
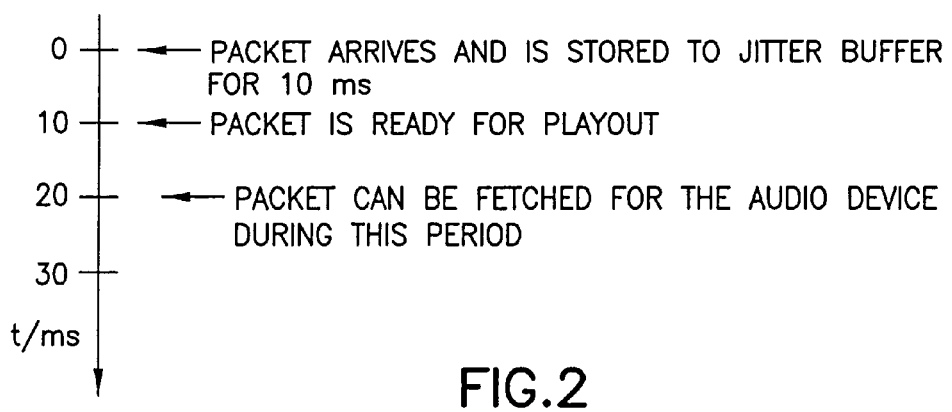
FIG. 2 is a diagram that is useful in understanding the synchronization delay between the media subsystem of FIG. 1 and arriving IP audio data packets.
Figure 3:
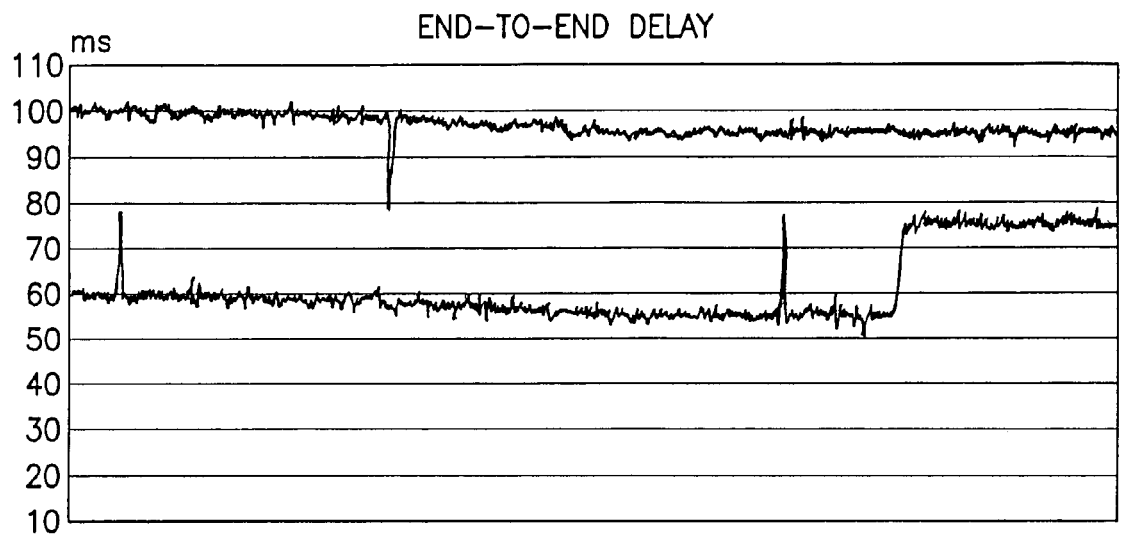
FIG. 3 is a diagram that shows a typical end-to-end delay experienced with a terminal-to-terminal call using a 20 ms frame length.

In general, the audio device 14 requests data representing playable sound at regular intervals, such as every 20 ms (i.e., the codec 20 frame rate). However, the reception of the IP packets from the packet network is not synchronized to the play wakeups generated by the audio device 14. More particularly, the audio device 14 typically will process audio in blocks of data that are the same length as the frame length of the codec 20, such as 20 ms. This results in an average synchronization delay of about one half of the frame length. For example, if the average frame length is 20 ms, then the average synchronization delay is about 10 ms. FIG. 2 depicts an exemplary synchronization delay for a 20 ms frame length, and FIG. 3 shows the end-to-end delay between two terminals with a frame length of 20 ms. In FIG. 3 the measurement points occur about once per second, the lower trace represents a 0 ms length jitter buffer while the upper trace represents a 30 ms jitter buffer. Note in FIG. 3 that the delay makes sudden excursions of about 20 ms, and then suddenly shifts by about 20 ms. The changes of delay are due to the lack or synchronization between the arriving IP packets and the operation of the audio device 14. The gradual shift in the synchronization delay is due to the use of the different clock frequencies in the two terminals (sender and receiver), and the resulting inability to maintain synchronization between the terminals.

These teachings arise from an appreciation by the inventor that many modem audio codecs have a voice activity detection (VAD) and comfort noise generation function, which means that when no speech (i.e., silence) is detected, no speech data is sent. Instead, silence information descriptor (SID) data is calculated and periodically transmitted, from which the receiving end synthesizes artificial background noise for the listener, commonly referred to as comfort noise. It has been found that the speech data tends to arrive during short intervals or periods referred to as talk spurts, which on average last for about one second, and which are preceded and followed by silent periods during which comfort noise is generated. By not transmitting during the unvoiced or silent periods, communications link bandwidth is conserved, and the power consumption of battery powered portable receiving terminals is also reduced. General reference with regard to the use of comfort noise can be made to commonly assigned U.S. Pat. No. 5,835,889 by Kapanen and U.S. Pat. No. 5,960,389 by Jarvinen et al. The inventor has exploited the use of the silence descriptor information in a manner described below.

In accordance with an aspect of these teachings the synchronization of the media subsystem 10A to the arrival of the incoming data packets is reset at the start of a new interval of speech, i.e., to the start of a new talk spurt. This implies, in a normal case, that the resynchronization would have an accuracy of about one frame length (e.g., 20 ms).

Further in accordance with these teachings, the synchronization delay experienced by the media subsystem 10A is reduced to less than the codec frame length (e.g., less than 20 ms), without adversely affecting voice quality, by the following method. First, the audio device 14 frame length is made to be some fraction of the frame length of the codec 20. For example, the audio device 14 frame length is reduced to one quarter of the frame length of the codec 20 (i.e., to 5 ms). This causes the audio device 14 to request audio data every 5 ms. A single 20 ms frame of audio data is decoded from the codec 20 to the buffer 14A, which is then fed to the audio device 14 in 5 ms increments. In addition, the type of audio data stored in the buffer 14A is recorded (i.e., whether it is voice data or comfort noise data).

During a period of comfort noise generation, the jitter buffer 18 is checked after every audio device 14 callback (or every 5 ms in this example) to determine if new playable data (e.g., voice data) has arrived from the packet data network. If no new playable data has arrived, then the audio device 14 continues to operate on the comfort noise data in the buffer 14A. However, if new playable data is detected in the jitter buffer 18, the comfort noise data in the buffer 14A is removed or overwritten with the just-arrived playable data, after it is decoded by the codec 20. That is, the playing of the comfort noise data is prematurely terminated, and the playing of the playable (e.g., voice) data is started sooner than it would normally have been. In this manner the synchronization delay is reduced to be one half of the audio device frame length, in this case to 2.5 ms, resulting in 7.5 ms of end-to-end delay being eliminated. This synchronization of the media subsystem timing 10A to the timing of the arriving voice data packets occurs at the beginning of each talk spurt. While some clock drift may still occur during an excessively long talk spurt, and as it is generally the case that the talk spurts have a duration of only about one second, the amount of clock drift that occurs during a typical talk spurt is not significant.

It is noted that the above-referenced error concealment data differs from comfort noise data, and if present is preferably not replaced by voice data.

It can be appreciated that the use of these teachings does not deteriorate the quality of the speech reproduced by the audio device 14, as the synchronization operation occurs during comfort noise generation, not during times when speech is being reproduced to the listener. Furthermore, in that the generation of the comfort noise generally produces a lower powered audio signal than does the generation of a voiced audio signal, the removal of a fraction of a comfort noise frame is typically not audible to the listener.

It can be appreciated that the synchronization optimization teachings of this invention become even more beneficial if the frame length of the codec 20 is larger (e.g., 30 ms or 60 ms).

Figure 4:
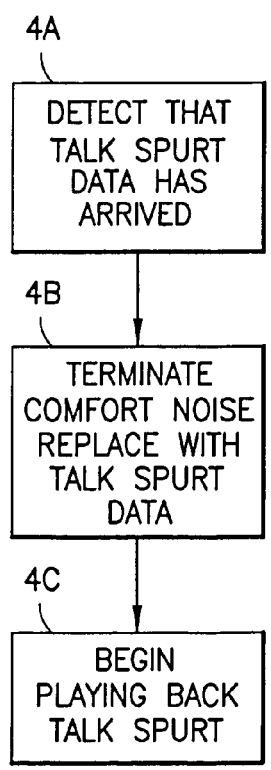
FIG. 4 is a logic flow diagram in accordance with the teachings herein.

Referring to FIG. 4, these teachings provide a method for operating the media subsystem 10A for playing back audio data, and includes, at Step 4-A, during a time that comfort noise is being generated by the audio device 14, detecting an arrival of a data packet that contains audio data representing a beginning of a talk spurt. At Step 4-B the method resynchronizes the media subsystem 10A to the beginning of the talk spurt by terminating the generation of comfort noise that precedes the talk spurt, and at Step 4-C the audio device 14 plays back the talk spurt.

The arriving data packet is assumed to contain at least one frame of audio data having a playback duration of X milliseconds (e.g., in the range of about 20 ms to about 60 ms), and the audio device 14 is arranged to request decoded audio data to be played back at a rate given by X/Y milliseconds, where Y is greater than one. For example, Y may be set so that X/Y<10 ms. Further by example, Y may be set so that X/Y=5 ms.

Figure 5:
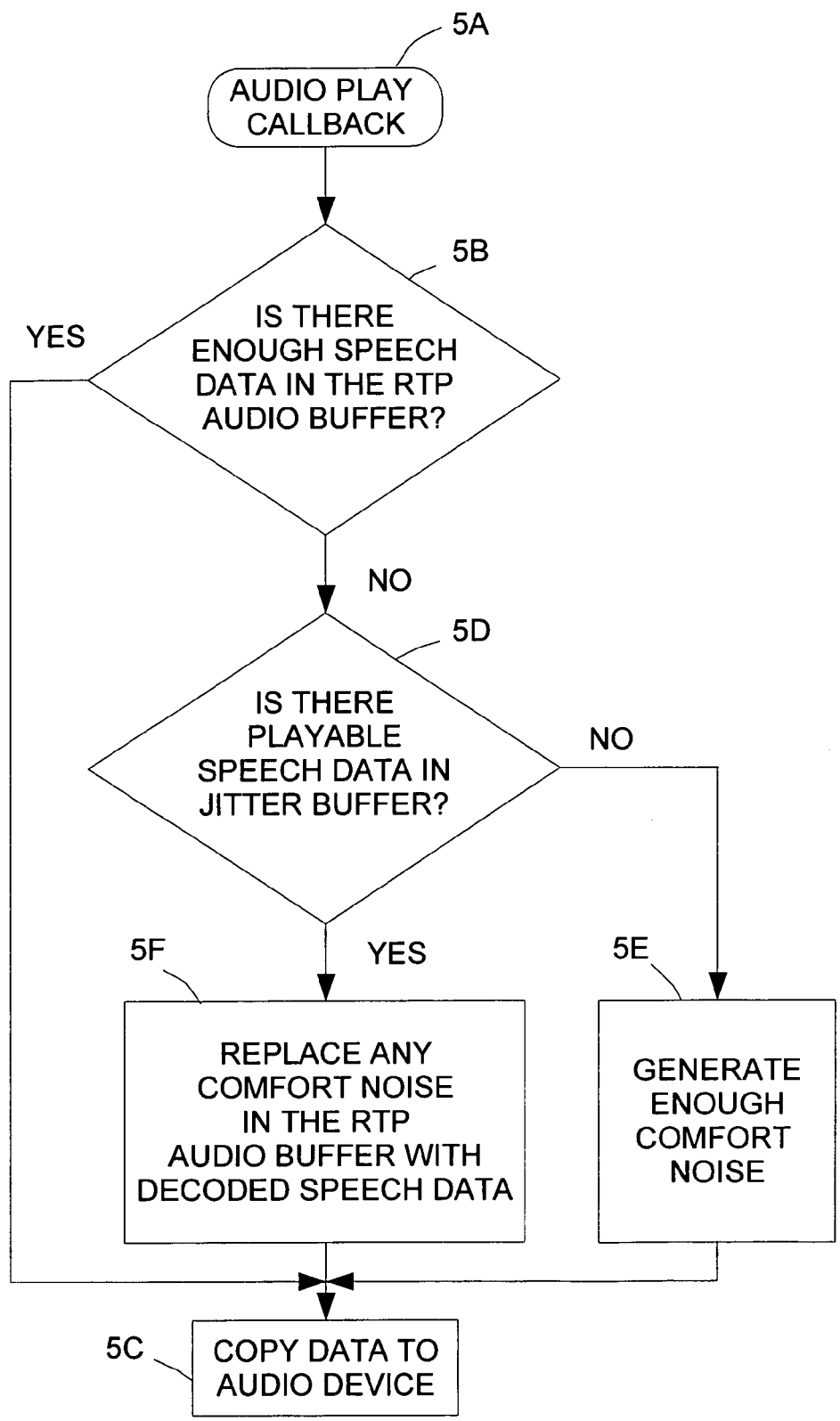
FIG. 5 is a more detailed logic flow diagram in accordance with a method of these teachings.

FIG. 5 is a more detailed logic flow diagram of these teachings. The method starts at Step 5-A at an audio play callback event. At Step 5-B a determination is made as to whether there is sufficient speech data in the RTP audio buffer 14A. If the determination is affirmative, control passes to Step 5-C to copy the data from the buffer 14A to the audio device 14. If the determination at Step 5-B is not affirmative, control instead passes to Step 5-D where a determination is made as to whether there is playable speech data in the jitter buffer 18. If No, comfort noise is generated at Step 5-E, and control then passes to Step 5-C to copy the comfort noise data to the audio device 14. If, however, playable speech data is found in the jitter buffer 18 at Step 5-D, then at Step 5-F any comfort noise data in the RTP speech buffer 14A is replaced with the (decoded) speech data, and control then passes to Step 5-C to copy the decoded speech data to the audio device 14.

While disclosed in the context of transmitting, storing and reproducing voice or speech data, it can be appreciated that these teachings are not limited to only voice or speech data, and that other types of audio data, such as music, may also benefit from the use of the methods and apparatus disclosed herein. In this case a 'talk spurt' can be assumed to represent some other type of audio information, such as a musical passage that follows of period of silence.

What is claimed is:

1. A method for operating a media subsystem for playing back audio data, comprising:

during a time that comfort noise is being generated, detecting an arrival of a data packet containing audio data representing a beginning of a talk spurt, wherein the arriving data packet is comprised of at least one frame of audio data having a playback duration of X milliseconds;

upon detecting the arrival of a data packet containing audio data representing the beginning of a talk spurt, resynchronizing the media subsystem to the beginning of the talk spurt by terminating the generation of comfort noise that precedes the talk spurt;

decoding a frame of audio data;

requesting decoded audio data to be played back at a rate of given by X/Y milliseconds, where Y is greater than one; and playing back the talk spurt.

2. A method for operating a media subsystem for playing back audio data, comprising:

during a time that comfort noise is being generated, detecting an arrival of a data packet containing audio data representing a beginning of a talk spurt, wherein the arriving data packet is comprised of at least one frame of audio data having a playback duration in the range of about 20 milliseconds to about 60 milliseconds;

upon detecting the arrival of a data packet containing audio data representing the beginning of a talk spurt, resynchronizing the media subsystem to the beginning of the talk spurt by terminating the generation of comfort noise that precedes the talk spurt;

decoding the at least one frame of audio data;

requesting decoded audio data to be played back at a rate of less than every 10 milliseconds; and playing back the talk spurt.

3. Apparatus for reproducing a speech signal, comprising circuitry, operable during a time that comfort noise is being generated, for storing data from a packet that contains data representing a beginning of an interval of speech, where the packet is comprised of at least one frame of speech data having a duration of X milliseconds, for detecting that data representing speech has been stored, for synchronizing the apparatus to the beginning of the interval of speech by terminating the generation of comfort noise that precedes the beginning of the interval of speech upon detection of the data representing the beginning of an interval of speech, and for reproducing the speech signal both by decoding the stored data from the packet, and by providing the decoded data to an audio device that requests decoded speech data at a rate given by X/Y milliseconds, where Y is greater than one, the audio device converting the decoded audio data to an audio speech signal.

4. Apparatus as in claim 3, wherein said circuitry comprises a codec for decoding a frame of stored data for producing a frame of decoded speech data having a duration of X milliseconds.

5. Apparatus as in claim 4, where said circuitry further comprises a buffer for storing said decoded frame of speech data, and in response to the request from the audio device, for providing the audio device with a X/Y portion of said stored frame of decoded speech data.

6. Apparatus as in claim 4, where said circuitry further comprises a jitter buffer for storing data from the packet and a buffer for storing the decoded frame of speech data, and where said circuitry operates in response to detecting that data representing speech has been stored in said jitter buffer for replacing a frame of comfort noise data stored in the buffer with a decoded frame of speech data representing the beginning of the interval of speech.

7. Apparatus as in claim 3, where said circuitry is contained within a wireless communications device, and where the packet is received from a radio channel.

8. Apparatus as in claim 3, where said circuitry is contained within a system or device that processes and plays back packetized audio data.

9. Apparatus as in claim 3, where said circuitry is contained within a terminal.

10. Apparatus as in claim 9, where said terminal is comprised of a mobile telephone or a personal communicator.

11. Apparatus as in claim 9, where said terminal is comprised of a cellular telephone.

12. Apparatus as in claim 9, where said terminal is comprised of a PC-based telephony system.

13. Apparatus as in claim 9, where said terminal is comprised of an IP telephony gateway.

14. Apparatus as in claim 9, where said terminal is comprised of an IP-to-circuit switched media transcoder.

15. Apparatus for reproducing a speech signal, comprising circuitry, operable during a time that comfort noise is being generated, for storing data from a packet that contains data representing a being of an interval of speech, where the packet is comprised of at least one frame of speech data having a duration in the range of about 20 milliseconds to about 60 milliseconds, for detecting that data representing speech has been stored, for synchronizing the apparatus to the beginning of the interval of speech by terminating the generation of comfort noise that precedes the beginning of the interval of speech upon detection of the data representing the beginning of an interval of speech, and for reproducing the speech signal both by decoding the stored data from the packet, and by providing the decoded data to an audio device that requests decoded speech data at a rate of less than every 10 milliseconds, the audio device converting the decoded data to an audio speech signal.

* * * * *

UNITED STATES PATENT AND TRADEMARK OFFICE
CERTIFICATE OF CORRECTION

| | | |
|---|---|---|
| PATENT NO. | : 7,110,416 B2 | Page 1 of 1 |
| APPLICATION NO. | : 09/946066 | |
| DATED | : September 19, 2006 | |
| INVENTOR(S) | : Selin | |

It is certified that error appears in the above-identified patent and that said Letters Patent is hereby corrected as shown below:

Claim 1, Column 6, line 65 delete "of".

Claim 15, Column 8, line 29, delete "being" and replace with --beginning--.

Signed and Sealed this

Twelfth Day of December, 2006

JON W. DUDAS
*Director of the United States Patent and Trademark Office*